US008237862B2

(12) United States Patent
Nakamura

(10) Patent No.: US 8,237,862 B2
(45) Date of Patent: Aug. 7, 2012

(54) ELECTRONIC DEVICE WITH REMOTE CONTROL FUNCTIONS

(75) Inventor: Ryousuke Nakamura, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 834 days.

(21) Appl. No.: 12/199,872

(22) Filed: Aug. 28, 2008

(65) Prior Publication Data

US 2009/0059092 A1 Mar. 5, 2009

(30) Foreign Application Priority Data

Sep. 4, 2007 (JP) ................................ 2007-229110

(51) Int. Cl.
*H04N 7/00* (2011.01)

(52) U.S. Cl. ......... 348/552; 348/734; 455/352; 345/156

(58) Field of Classification Search .................. 348/552, 348/734; 455/352; 345/156

See application file for complete search history.

(56) References Cited

U.S. PATENT DOCUMENTS 5,081,534 A * 1/1992 Geiger et al. ................. 348/734
5,410,326 A * 4/1995 Goldstein ..................... 348/734
7,224,410 B1 * 5/2007 Gerstman ..................... 348/734
7,952,467 B2 * 5/2011 Hardacker et al. ......... 340/12.22
2003/0234737 A1 * 12/2003 Nelson et al. ................. 341/176
2004/0143847 A1 * 7/2004 Suzuki et al. ................... 725/61
2004/0174288 A1 * 9/2004 Park .............................. 341/176
2004/0189591 A1 * 9/2004 Breuil ........................... 345/156
2004/0257239 A1 * 12/2004 Griesau et al. ........... 340/825.69
2005/0120383 A1 * 6/2005 Ozaki et al. ................... 725/131
2005/0151886 A1 * 7/2005 Hirano .......................... 348/734
2005/0168658 A1 * 8/2005 Woolgar et al. ............... 348/734
2005/0212979 A1 * 9/2005 Morita et al. ................. 348/734
2006/0001565 A1 * 1/2006 Griesau et al. ................ 341/176
2006/0087445 A1 * 4/2006 Green ...................... 340/825.22
2008/0001773 A1 * 1/2008 Rye et al. ................. 340/825.22
2008/0094245 A1 * 4/2008 Hardacker et al. ....... 340/825.22
2008/0174467 A1 * 7/2008 Drimusz et al. .............. 341/176
2008/0180393 A1 * 7/2008 Iwamura ....................... 345/156
2008/0297372 A1 * 12/2008 Wouters .................. 340/825.69
2010/0127886 A1 * 5/2010 Hardacker et al. ....... 340/825.22

FOREIGN PATENT DOCUMENTS

JP 2007-97095 A 4/2007
WO WO 00/70578 * 11/2000

* cited by examiner

*Primary Examiner* — Jefferey Harold
*Assistant Examiner* — Sam Huang
(74) *Attorney, Agent, or Firm* — Global IP Counselors

(57) ABSTRACT

An electronic device is electrically connected to an external electronic device. The electronic device includes an assignment component, a memory component and a control component. The assignment component is configured to assign control codes that control operations of the external electronic device to a plurality of control keys of a remote control to generate assignment information indicating corresponding relationship between the control codes and the control keys of the remote control. The memory component is configured to store the assignment information generated by the assignment component. The control component is configured to control the external electronic device based on the assignment information stored in the memory component when the control component receives an operation signal indicating that one of the control keys of the remote control is operated.

15 Claims, 5 Drawing Sheets

ELECTRONIC DEVICE WITH REMOTE CONTROL FUNCTIONS

CROSS-REFERENCE TO RELATED APPLICATIONS

This application claims priority to Japanese Patent Application No. 2007-229110 filed on Sep. 4, 2007. The entire disclosure of Japanese Patent Application No. 2007-229110 is hereby incorporated herein by reference.

BACKGROUND OF THE INVENTION

1. Field of the Invention

The present invention generally relates to an electronic device. More specifically, the present invention relates to an electronic device that is connected to an external electronic device via a control cable.

2. Background Information

As advances have been made in recent years in liquid crystal panel manufacturing technology, we have seen greater resolution in display of television receivers. The television receivers are used with DVD recorders, DVD recorders with built-in hard disks, and other such information recording and reproduction devices. Between the television receivers and the information recording and reproduction devices, large quantities of video and audio data are sent and received. Thus, an HDMI (High Definition Multimedia Interface) interface circuit has been used to connect between the television receivers and the information recording and reproduction devices.

The HDMI is an interface for transmitting various kinds of data, including video and audio data, between a sending side, such as a television receiver or a projector, and a receiving side, such as a DVD recorder or a DVD recorder with a built-in hard disk. A CEC (Consumer Electronics Control) function of the HDMI allows power of the information recording and reproduction device to be switched on when power of the television receiver is switched on, for example.

Recently, there have been proposed a variety of electronic devices that have an HDMI terminal that meets the HDMI standards. The electronic devices can be connected via an HDMI cable to another electronic device that meets the HDMI standards.

With a conventional AV system discussed in Japanese Laid-Open Patent Application Publication No. 2007-97095, even if AV devices from different manufacturers are connected together, these AV devices can be mutually controlled with a single remote control transmitter (hereinafter referred to as "remote control"). The remote control that comes with a television set made by company A is equipped with a dedicated switch group for controlling the television set made by the company A. Furthermore, the remote control is equipped with an other device switch group for controlling another device (such as a DVD player made by company B).

When the user operates a switch in the other device switch group of the remote control, a control code assigned to a function corresponding to the switch is transmitted as a remote control signal. Then, the remote control signal is received by a remote control receiver of the television set made by company A. Furthermore, when a CPU of the television set made by company A recognizes the control code received through the remote control receiver as a control code for controlling the DVD player made by the company B, the received control code is converted into a corresponding common control code based on a conversion table. Then, the converted common control code is transmitted through an AV cable to the DVD player made by company B. A CPU of the DVD player made by company B converts the common control code received from the television set made by company A into a company B-specific code based on a conversion table. As a result, the DVD player is operated based on the converted company B-specific code.

With the conventional AV system, control codes for other devices (the ones to be controlled) are pre-assigned to the switches of the other device switch group provided to the remote control. Therefore, the user has to remember which control code is assigned to which switch. Also, users use remote controls in different ways. Thus, some switches used often and others less often. However, when the control codes are pre-assigned to each of the switches of the other device switch group, depending on the user, the control codes that are not used very often are assigned to switches in easy-to-operate locations, and the control codes that are used frequently are assigned to switches in difficult-to-operate locations.

Also, with the conventional AV system, since the other device switch group is provided separately from the dedicated switch group, there are more switches on the remote control. However, since the remote control itself is required to be smaller, the size of the switches themselves ends up being smaller, or the switches have to be positioned more closely together. As a result, it becomes more difficult for the user to operate the remote control.

In view of the above, it will be apparent to those skilled in the art from this disclosure that there exists a need for an improved electric device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide an electric device that makes it easier to operate an external electronic device connected to the electric device with a remote control of the electric device.

In accordance with one aspect of the present invention, an electronic device is electrically connected to an external electronic device. The electronic device includes an assignment component, a memory component and a control component. The assignment component is configured to assign control codes that control operations of the external electronic device to a plurality of control keys of a remote control to generate assignment information indicating corresponding relationship between the control codes and the control keys of the remote control. The memory component is configured to store the assignment information generated by the assignment component. The control component is configured to control the external electronic device based on the assignment information stored in the memory component when the control component receives an operation signal indicating that one of the control keys of the remote control is operated.

With the electric device of the present invention, it is possible to provide an electric device that makes it easier to operate an external electronic device connected to the electric device with a remote control of the electric device.

These and other objects, features, aspects and advantages of the present invention will become apparent to those skilled in the art from the following detailed descriptions, which, taken in conjunction with the annexed drawings, disclose selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENT

Selected embodiments of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
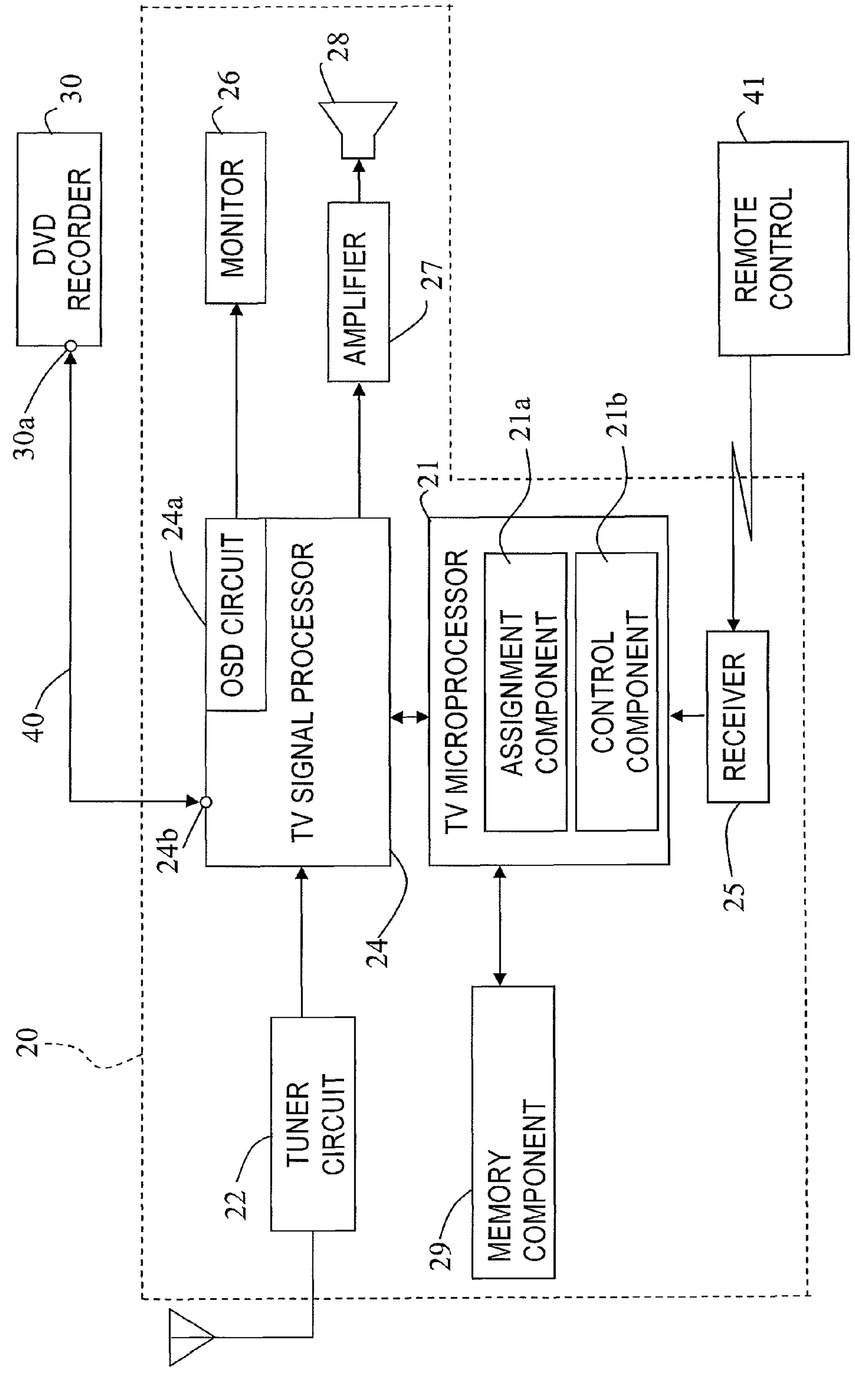
FIG. 1 is a block diagram illustrating a television receiver in accordance with a first embodiment of the present invention.

FIG. 1 is a block diagram of a television receiver (e.g., electronic device). The television receiver receives digital broadcasts. The television receiver includes a TV control system 20 housed in a casing of the television receiver. The TV control system 20 further includes a TV microprocessor 21, a tuner circuit 22, TV signal processor (e.g., television receiving component) 24, a receiver 25, a monitor 26, an amplifier 27, a internal speaker 28 and a memory component 29. The TV microprocessor 21 controls the entire TV control system 20. The TV microprocessor 21 includes an assignment component 21*a* and a control component 21*b*. The assignment component 21*a* assigns control codes to first to fourth control keys 41*f* to 41*i* of a remote control transmitter (hereinafter referred to as "remote control") 41 shown in FIG. 2, and generates control key assignment information. The control codes are operation commands that control operations of a DVD recorder (e.g., external electronic device) 30 externally connected to the television receiver. The control key assignment information indicates corresponding relationship between the control codes and the first to fourth control keys 41*f* to 41*i* of the remote control 41. The control component 21*b* controls the DVD recorder 30 based on the control key assignment information. The tuner circuit 22 receives digital television signals of the digital broadcasts. An output of the tuner circuit 22 is connected to the TV signal processor 24. The TV signal processor 24 performs signal processing of the digital broadcasts. Specifically, the TV signal processor 24 performs video and audio signal processing of the digital broadcasts. An output of the TV signal processor 24 is connected to the monitor 26. The monitor includes a display device, such as a CRT, a liquid crystal panel, and the like. The output of the TV signal processor 24 is also connected to the internal speaker 28 via the amplifier 27.

The TV signal processor 24 has an OSD circuit (e.g., display component) 24*a* and an HDMI (High Definition Multimedia Interface) terminal 24*b*. The OSD circuit 24*a* displays various setting screens on the monitor 26. Specifically, the OSD circuit 24*a* displays a menu screen for performing various settings of the television receiver, a channel tuning screen when a channel is changed, or a control key assignment setting screen (e.g., assignment setting screen) 100. The HDMI terminal 24*b* is an input/output terminal for digital signals (digital video signal, digital audio signal or digital control signal) that meets HDMI standards. The HDMI terminal 24*b* is connected via an HDMI cable 40 to an HDMI terminal 30*a* of the DVD recorder 30 that meets HDMI standards. The HDMI terminal 24*b* transmits the control codes to the DVD recorder 30. The DVD recorder 30 is electrically and externally connected to the television receiver.

The TV signal processor 24 decodes the digital television signals received via the tuner circuit 22 into the digital video and audio signals. The TV signal processor 24 also displays the video signal on the monitor 26 and outputs the audio signal from the internal speaker 28. The control component 21*b* of the TV microprocessor 21 controls the TV signal processor 24.

The receiver 25 receives various operation signals from the remote control 41 of the television receiver. The TV microprocessor 21 is connected to an output of the receiver 25. The control component 21*b* of the TV microprocessor 21 performs operational control of the TV control system 20, setting of the control codes of the DVD recorder 30 and control processing of the DVD recorder 30 based on the various operation signals sent from the remote control 41.

The memory component 29 is connected to the TV microprocessor 21. The memory component 29 stores a channel table, processing programs, the control codes, the control key assignment information, etc. The channel table is a table information in which various channels have been set by auto-preset or the like through operation of the remote control 41. The processing programs is programs for setting connection settings (such as video and audio settings) when the television receiver is connected via the HDMI cable 40 to the DVD recorder 30. The control codes are operation command for the DVD recorder 30. Specifically, the control codes include CEC (Consumer Electric Control) messages defined by the HDMI standards. The control key assignment information is set by the user by operating the remote control 41. The control key assignment information is set sequentially from the control code assignment setting screen 100 shown in FIG. 3 by operating the remote control 41. The control key assignment setting screen 100 prompts to input an assignment of the control codes to the control keys.

Figure 2:
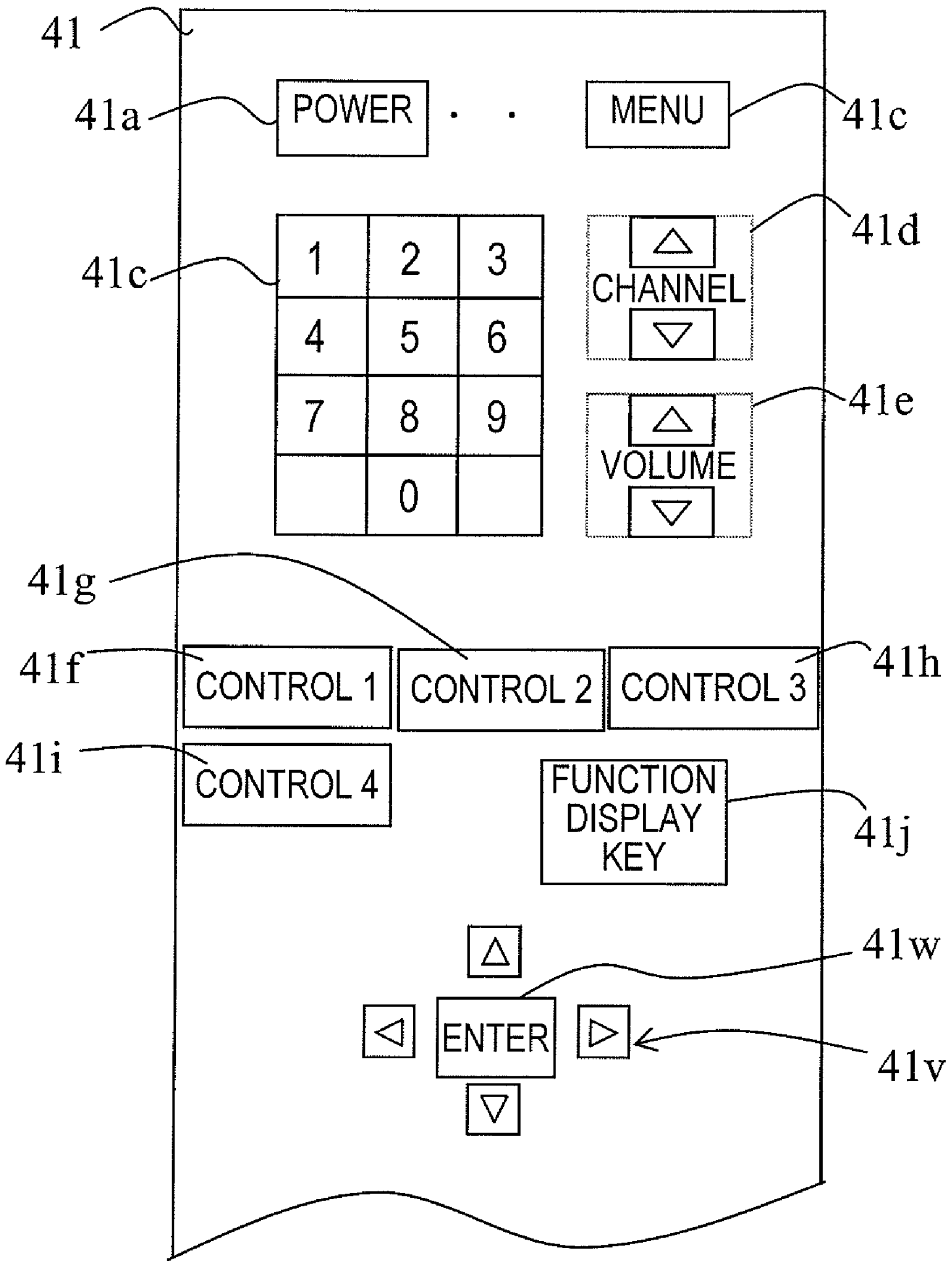
FIG. 2 is a plan view of a remote control of the television receiver illustrated in FIG. 1.

FIG. 2 is a plan view of the remote control 41.

The remote control 41 has a power key 41*a*, a menu key 41*b*, number keys 41*c*, channel up and down keys 41*d*, volume up and down keys 41*e*, a plurality of first to fourth control keys (e.g., control keys) 41*f* to 41*i*, a function display key (e.g., assignment information display key) 41*j*, directional keys 41*v*, an enter key 41*w*, and so forth. Although not depicted, various other function keys needed for operation can be also disposed. The first to fourth control keys 41*f* to 41*i* is keys for controlling the DVD recorder 30 (four in this example, but the number is not limited to four). The function display key 41*j* is a key for displaying the control key assignment information set to the first to fourth control keys 41*f* to 41*i* on the monitor 26. The enter key 41*w* is disposed in the middle of the directional keys 41*v*. The user can freely set (assign) the control codes for the DVD recorder 30 to the first to fourth control keys 41*f* to 41*i*. However, even if the user has not set any control codes, default control codes are preset to the first to fourth control keys 41*f* to 41*i*. Therefore, the user can use the first to fourth control keys 41*f* to 41*i* with default functions corresponding to the default control codes without assigning the control codes to the first to fourth control keys 41*f* to 41*i*.

The processing in which the user sets (assigns) the control codes to the first to fourth control keys 41*f* to 41*i* will now be described in detail.

First, the power of the television receiver is turned on. If the user operates the menu key 41*b* on the remote control 41, then the control component 21*b* of the TV microprocessor 21 receives an operation signal from the remote control 41 via the receiver 25. Then, the TV signal processor 24 receives a command from the control component 21*b* of the TV microprocessor 21 to display a menu screen and the OSD circuit 24*a* displays the menu screen on the monitor 26. The user selects a control key setting category from among displayed lists of the menu by moving a cursor on the menu screen of the monitor 26 to the control key setting category with the directional keys 41*v*, and pressing the enter key 41*w*. As a result, the control component 21*b* of the TV microprocessor 21 read the control code assignment setting screen 100 for assigning the control codes (functions) to the first to fourth control keys 41*f* to 41*i* from the memory component 29, and the OSD circuit 24*a* displays the control code assignment setting screen 100 on the monitor 26. The cursor referred to here includes not only a graphic display such as a pointer, but also a display in which the category is inverted or highlighted, for example, so as to make the display form stand out.

Figure 3:
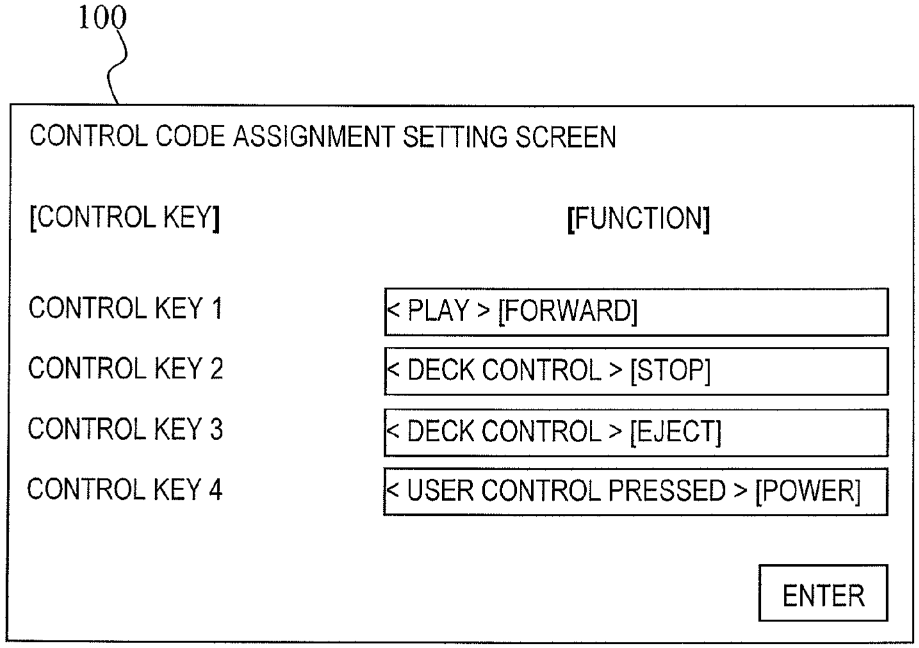
FIG. 3 is a screen shot of a control code assignment setting screen.

Key names of the first to fourth control keys 41*f* to 41*i* are displayed on the left side of the control code assignment setting screen 100 as shown in FIG. 3 (in FIG. 3, the key names of the first to fourth control keys 41*f* to 41*i* are displayed as control key 1, control key 2, control key 3, and control key 4, respectively). Function boxes used for setting the control codes to be assigned to the first to fourth control keys 41*f* to 41*i* are displayed correspondingly on the right side of the corresponding key names of the first to fourth control keys 41*f* to 41*i* on the control code assignment setting screen 100. The function boxes starts out blank or displays the default control codes.

The television receiver has a CEC (Consumer Electronic Control) function. The various control codes (CEC messages) used for CEC control are stored internally ahead of time. Specifically, the control codes are stored in a specific area of the memory component 29. Therefore, when the user presses the directional keys 41*v* of the remote control 41 to move the cursor to one of the function boxes, a list of the control codes is displayed next to the function box. Then, the user can select one of the control codes, and assign the control codes to the first to fourth control keys 41*f* to 41*i*, respectively.

The user sequentially sets the control codes to the first to fourth control keys 41*f* to 41*i*. Once the control codes have been set for all (or some) of the first to fourth control keys 41*f* to 41*i*, the cursor is finally moved to an "enter" box displayed in the lower right corner of the control code assignment setting screen 100. Then, if the user presses the enter key 41*w* on the remote control 41, the assignment of the control codes for the DVD recorder 30 to the first to fourth control keys 41*f* to 41*i* is completed. Specifically, the assignment component 21*a* of the TV microprocessor 21 generates the control key assignment information based on the assignment set by the user via the control code assignment setting screen 100, and stores the control key assignment information indicating corresponding relationship between the control codes and the first to fourth control keys 41*f* to 41*i* in a specific area of the memory component 29. As a result, when one of the first to fourth control keys 41*f* to 41*i* is pressed while the remote control 41 is aimed at the television receiver, the DVD recorder 30 electrically connected via the HDMI cable 40 can be controlled according to the one of the first to fourth control keys 41*f* to 41*i*. Specifically, when one of the first to fourth control keys 41*f* to 41*i* is pressed, the control component 21*b* of the TV microprocessor 21 receives the operation signal indicating that the one of the first to fourth control keys 41*f* to 41*i* is pressed. Then, the control component 21*b* of the TV microprocessor 21 reads the corresponding control code from the control key assignment information stored in the memory component 29. Then, the control code is transmitted through the HDMI cable 40 to the DVD recorder 30 based on the HDMI standards. Upon receiving the control code, the DVD recorder 30 executes a control operation according to the control code.

FIG. 3 shows the case in which the first control key 41*f* (control key 1) is set to "play," the second control key 41*g* (control key 2) is set to "stop," the third control key 41*h* (control key 3) is set to "eject," and the fourth control key 41*i* (control key 4) is set to "power (on/off)."

For example, while watching a program on the television receiver, the user decides to play an optical disk (DVD) loaded in the DVD recorder 30. Then, the user presses a mode switching key (not shown) on the remote control 41 to switch the television receiver to video mode (external input mode), and presses the fourth control key 41*i* on the remote control 41 to turn on the power to the DVD recorder 30. Furthermore, the user presses the first control key 41*f* on the remote control 41 to play the optical disk. As a result, the DVD recorder 30 begins reproducing information recorded on the optical disk (or a built-in hard disk, in the case when the DVD recorder 30 includes a built-in hard disk).

Since the control codes have been set as desired by the user to the first to fourth control keys 41*f* to 41*i*, it is conceivable that the user may forget which of the control codes is set to which of the first to fourth control keys 41*f* to 41*i*. Also, when the television receiver is used at home, if the assignment of the control codes is made by the father, the mother and children may not know which of the control codes is set to which of the first to fourth control keys 41*f* to 41*i*. Furthermore, the settings made by the father can be further modified by the mother. Therefore, the wrong control keys can be pressed.

Figure 4:
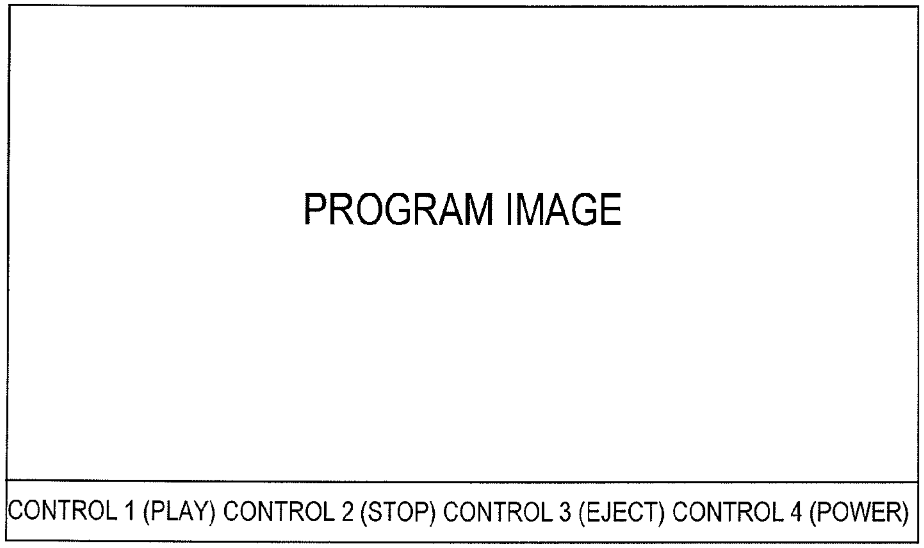
FIG. 4 is a screen shot of a control key assignment information displayed on a program screen.

In view of this, with the television receiver, the function display key 41*j* is disposed on the remote control 41 to display the control key assignment information about the assignment of the control codes to the first to fourth control keys 41*f* to 41*i*. The function display key 41*j* is pressed first to display the control key assignment information before one of the first to fourth control keys 41*f* to 41*i* is pressed. When the control component 21*b* of the TV microprocessor 21 receives the operation signal indicating that the function display key 41*j* is operated from the remote control 41, the control component 21*b* of the TV microprocessor 21 operates the OSD circuit 24*a* to display the control key assignment information that indicates the corresponding relationship between the control codes and the first to fourth control keys 41*f* to 41*i* stored in the memory component 29. Specifically, the control key assignment information is displayed at the bottom part of a program screen that displays a program image received via the tuner circuit 22 or from the DVD recorder 30, as shown in FIG. 4. As a result, the user can select one of the first to fourth control keys 41*f* to 41*i* of the remote control 41 while looking at the corresponding relationship. Thus, the user is prevented from accidentally pressing the wrong control key.

With the television receiver, the user can freely set the control codes for the DVD recorder 30 and assign the control codes to the first to fourth control keys 41*f* to 41*i* on the remote control 41. This allows the functions that the user wishes to use to be assigned to the first to fourth control keys 41*f* to 41*i*, respectively. Thus, the remote control 41 is easier (that is, more convenient) for the user to operate.

With the television receiver, the user can assign the control codes to the first to fourth control keys 41*f* to 41*i* while viewing the control code assignment setting screen 100. Thus, the assignment is more easily accomplished, and mistaken assignments can also be prevented.

The present invention is not limited to the remote control of the television receiver. For instance, it is also possible to apply the present invention to DVD recorders, DVD recorders with built-in hard disks, and other such information recording and reproduction devices. Furthermore, it is also possible to apply the remote control 41 of the television receiver to the remote controls used for the information recording and reproduction devices.

Second Embodiment

Figure 5:
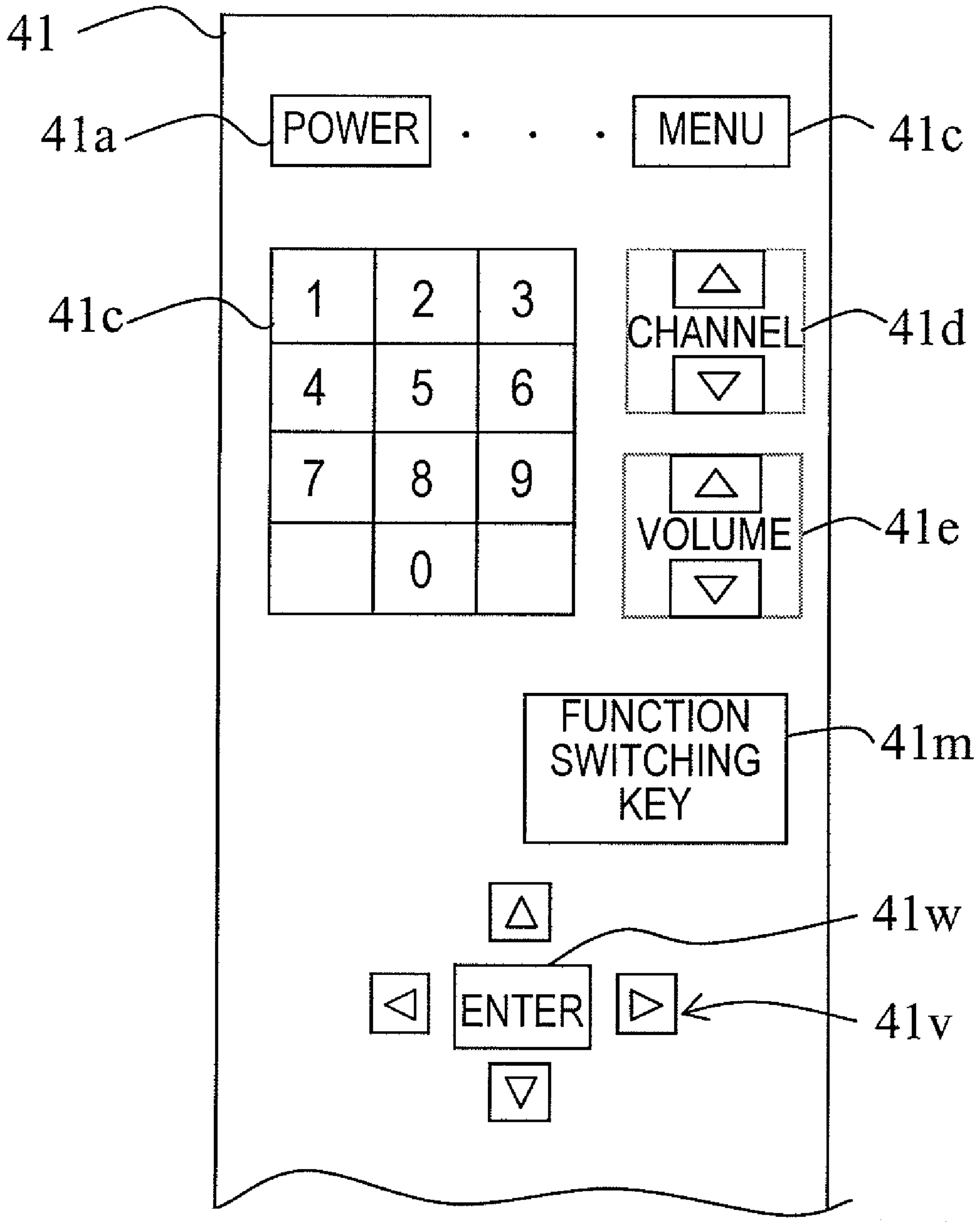
FIG. 5 is a plan view of a remote control of a television receiver in accordance with a second embodiment of the present invention.
Figure 6:
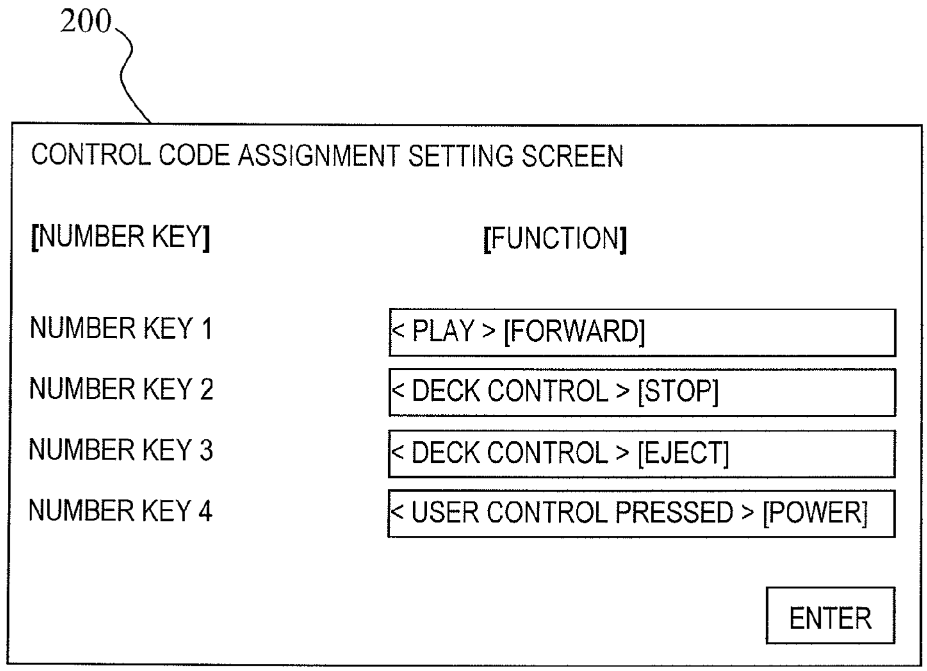
FIG. 6 is a screen shot of a control code assignment setting screen.
Figure 7:
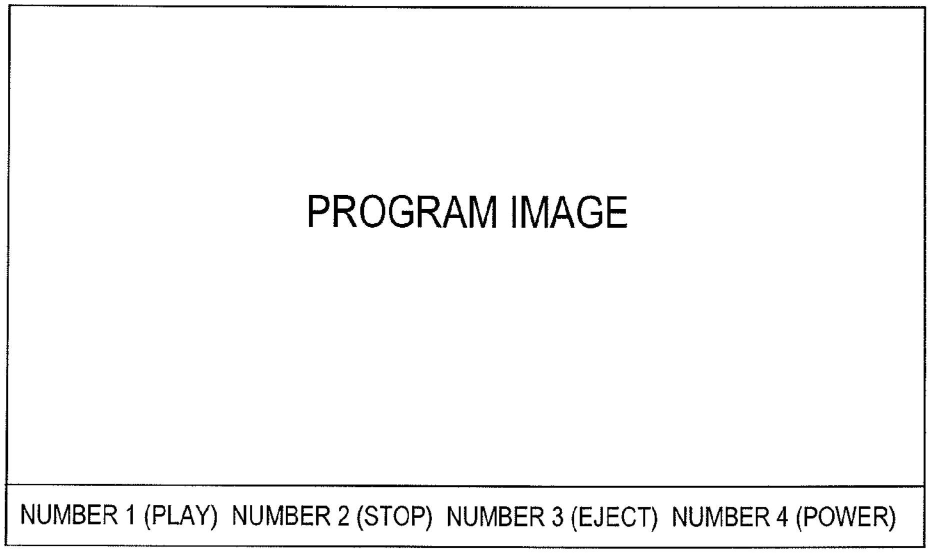
FIG. 7 is a screen shot of a control key assignment information displayed on a program screen.

Referring now to FIG. 5-7, a television receiver in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the first to fourth control keys 41*f* to 41*i* are provided separately on the remote control 41. In the second embodiment, a plurality of number keys 41*c* of the remote control 41 serves as the control keys. As a result, there are less keys disposed on the remote control 41. Thus, the keys can be larger in size, or the space between the keys can be widened. The hardware configuration of the television receiver in accordance with the second embodiment is the same as the hardware configuration shown in FIG. 1.

FIG. 5 is a plan view of the remote control 41.

The remote control 41 has a power key 41*a*, a menu key 41*b*, a plurality of number keys (e.g., control keys) 41*c* (a number key 41*c*0 having number "0" to a number key 41*c*9 having number "9"), channel up and down keys 41*d*, volume up and down keys 41*e*, directional keys 41*v*, an enter key 41*w*, a function switching key 41*m*, and so forth. The number keys 41*c*0 to 41*c*9 is used for numerical input, such as an input of numbers of the channel, for example. The number keys 41*c*0 to 41*c*9 also serve as control keys for controlling a DVD recorder 30 externally connected to the television receiver. The enter key 41*w* is disposed in the middle of the directional keys 41*v*. The function switching key 41*m* switches the functions of number keys 41*c*0 to 41*c*9 so that the number keys 41*c*0 to 41*c*9 serve as the control keys to control the DVD recorder 30. Specifically, the function switching key 41*m* switches the functions of number keys 41*c*0 to 41*c*9 between entering numbers for the television receiver and entering the control codes for the DVD recorder 30. Although not depicted, various other function keys needed for operation are also disposed. The user can freely set the control codes for the DVD recorder 30 to the number keys 41*c*0 to 41*c*9. Here, the number keys 41*c*0 to 41*c*9 are differentiated from each other by adding numerals to the number keys 41*c*.

The setting operation in which the user sets (assigns) the control codes to the number keys 41*c*0 to 41*c*9 will now be described in detail.

First, the power of the television receiver is turned on. If the user operates the menu key 41*b* on the remote control 41, then a control component 21*b* of a TV microprocessor 21 receives an operation signal from the remote control 41 via a receiver 25. Then, a TV signal processor 24 receives a command from the control component 21*b* of the TV microprocessor 21 to display a menu screen and an OSD circuit 24*a* displays the menu screen on the monitor 26. The user selects a control key setting category from among the displayed lists of the menu by moving a cursor on the menu screen of the monitor 26 to the control key setting category with the directional keys 41*v*, and pressing the enter key 41*w*. As a result, the control component 21*b* of the TV microprocessor 21 read a control code assignment setting screen 200 for assigning the control codes to the number keys 41*c*0 to 41*c*9 shown in FIG. 6 from the memory component 29, and the OSD circuit 24*a* displays the control code assignment setting screen 200 on the monitor 26.

Key names of the number keys 41*c*0 to 41*c*9 are displayed on the left side of the control code assignment setting screen 200 as shown in FIG. 6. Function boxes used for setting the control codes to be assigned to the number keys 41*c*0 to 41*c*9 are displayed correspondingly on the right side of the corresponding key names of the number keys 41*c*0 to 41*c*9 on the control code assignment setting screen 200. The function boxes starts out blank or displays the default control codes.

The control codes are stored in a specific area of the memory component 29. Therefore, when the user presses the directional keys 41*v* of the remote control 41 to move the cursor to one of the function boxes, a list of the control codes (CEC messages) is displayed next to the function box. Then, the user can select one of the control codes, and assign the control codes to the number keys 41*c*0 to 41*c*9.

The user sequentially sets the control codes to the number keys 41*c*0 to 41*c*9. Once the control codes have been set for all (or some) of the number keys 41*c*0 to 41*c*9, the cursor is finally moved to an "enter" box displayed in the lower right corner of the control code assignment setting screen 200. Then, if the user presses the enter key 41*w* on the remote control 41, the assignment of the control codes for the DVD recorder 30 to the number keys 41*c*0 to 41*c*9 is completed. Specifically, an assignment component 21*a* of the TV microprocessor 21 generates the control key assignment information set by the user via the control code assignment setting screen 200, and stores the control key assignment information indicating corresponding relationship between the control codes and the number keys 41*c*0 to 41*c*9 in a specific area of the memory component 29. As a result, after the function switching key 41*m* is pressed to switch the function of the number keys 41*c*0 to 41*c*9 to the function of the control keys for the DVD recorder 30, one of the number keys 41*c*0 to 41*c*9 is pressed while the remote control 41 is aimed at the television receiver. Then, the DVD recorder 30 externally connected via the HDMI cable 40 can be controlled according to the one of the number keys 41*c*0 to 41*c*9. Specifically, when one of the number keys 41*c*0 to 41*c*9 is pressed, the control component 21*b* of the TV microprocessor 21 receives the operation signal indicating that the one of the number keys 41*c*0 to 41*c*9 is pressed. Then, the control component 21*b* of the TV microprocessor 21 reads the corresponding control code from the control key assignment information stored in the memory component 29. Then, the control code (CEC message) is sent through the HDMI cable 40 to the DVD recorder 30. Upon receiving the control code, the DVD recorder 30 executes a control operation according to the control code.

FIG. 6 shows the case in which the number key 41*c*1 (number 1) is set to "play," the number key 41*c*2 (number 2) is set to "stop," the number key 41*c*3 (number 3) is set to "eject," and the number key 41*c*4 (number 4) is set to "power (on/off)."

For example, while watching a program on the television receiver, the user decides to play an optical disk (DVD) loaded in the DVD recorder 30. Then, the user presses a mode switching key (not shown) on the remote control 41 to switch the television receiver to video mode (external input mode), and presses the function switching key 41*m* on the remote control 41 to switch the function of the number keys 41*c*0 to 41*c*9 to the function of the control keys for the DVD recorder 30. After this, the number key 41*c*4 on the remote control 41 is pressed to turn on the power to the DVD recorder 30. Furthermore, the user presses the number key 41*c*1 on the remote control 41 to play the optical disk. As a result, the DVD recorder 30 begins reproducing information recorded on the optical disk (or a built-in hard disk, in the case when the DVD recorder 30 includes a built-in hard disk).

Since the control codes have been set as desired by the user to the number keys 41*c*0 to 41*c*9, it is conceivable that the user may forget which of the control codes is set to which of the number keys 41*c*0 to 41*c*9. Also, when the television receiver is used at home, if the assignment of the control codes is made by the father, the mother and children may not know which of the control codes is set to which of the number keys 41*c*0 to 41*c*9. Furthermore, the settings made by the father can be further modified by the mother. Therefore, the wrong number keys 41*c*0 to 41*c*9 can be pressed.

In view of this, with the television receiver, the function switching key 41*m* is disposed on the remote control 41 to display the control key assignment information about the assignment of the control codes to the number keys 41*c*0 to 41*c*9. When the function switching key 41*m* is pressed, the control component 21*b* of the TV microprocessor 21 receives the operation signal indicating that the function display key 41*j* is operated from the remote control 41. Then, the control component 21*b* of the TV microprocessor 21 operates the OSD circuit 24*a* to display the control key assignment information that is the corresponding relationship between the control codes and the number keys 41*c*0 to 41*c*9 stored in the memory component 29. Specifically, the control key assignment information is displayed at the bottom part of a program screen that displays a program image received via the tuner circuit 22 or from the DVD recorder 30, as shown in FIG. 7. As a result, the user can operate the number keys 41*c*0 to 41*c*9 of the remote control 41 as the control keys while looking at the corresponding relationship. Thus, the user is prevented from accidentally pressing the wrong control key. In FIG. 7, the number keys and the corresponding control functions are merely displayed in text form. However, the same key layout as that of the number keys 41*c*0 to 41*c*9 on the remote control 41 can be displayed in the corner of the program screen, and the words "play," "stop," "eject," and "power" can be written under or in the middle of the corresponding number keys 41*c*0 to 41*c*9. This allows the user to confirm the various control functions with the same layout as that of the number keys 41*c*0 to 41*c*9 on the actual remote control 41. As a result, the accidental pressing of the wrong number keys 41*c*0 to 41*c*9 is prevented even more effectively.

When the function switching key 41*m* is pressed again in this state, the number keys 41*c*0 to 41*c*9 are restored to the usual key functions for numerical input.

With the television receiver, since the control key assignment information about the assignment of the control codes is displayed on-screen when the number keys 41*c*0 to 41*c*9 are used to control the DVD recorder 30, the number keys 41*c*0 to 41*c*9 to be pressed can be selected while visually confirming the control key assignment information on the screen. Thus, the user can easily and quickly determine which number keys 41*c*0 to 41*c*9 are to be pressed, and press the number keys 41*c*0 to 41*c*0. This makes the remote control easier to operate for the user.

Also, with the television receiver, because the number keys 41*c*0 to 41*c*9 also serve as the control keys, the number of keys that have to be arranged on the remote control 41 can be reduced. This means the individual keys do not have to be made as small as in the past, or laid out as closely together. Thus, operational functions can be diversified while the ease of remote control operation can be kept the same.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of an electric device equipped with the present invention. Accordingly, these terms, as utilized to describe the present invention should be interpreted relative to an electric device equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. An electronic device electrically connected to an external electronic device, the electronic device comprising:

a receiver configured to receive an operation signal from a remote control with a plurality of control keys, the operation signal indicating an operation of one of the control keys of the remote control;

an assignment component configured to freely assign control codes that control operations of the external electronic device to the control keys of the remote control, respectively, to generate assignment information indicating corresponding relationship between the control codes and the control keys of the remote control;

a memory component configured to store the assignment information generated by the assignment component;

a control component configured to determine one of the control codes based on the assignment information stored in the memory component and the operation signal received from the remote control when the control component receives the operation signal from the remote control;

a display component configured to display the assignment information stored in the memory component on a portion of a program screen of the display component in response to a function display key of the remote control being operated before operation of one of the control keys of the remote control; and a transmission component configured to transmit the control code determined by the control component to the external electronic device.

2. The electronic device according to claim 1, wherein the display component is further configured to display an assignment setting screen that prompt to input an assignment of the control codes to the control keys, the assignment component being further configured to assign the control codes to the control keys based on the assignment of the control codes to the control keys inputted via the assignment setting screen.

3. The electronic device according to claim 1, wherein the display component is operatively coupled to the control component, and configured to display the assignment information stored in the memory component when the control component receives an operation signal indicating that an assignment information display key of the remote control is operated.

4. The electronic device according to claim 1, wherein the remote control further has a function switching key being configured to switch a function of a plurality of number keys of the remote control for numerical input so that the number keys serve as the control keys to control the external electronic device.

5. The electronic device according to claim 4, wherein the display component is operatively coupled to the control component, and configured to display the assignment information that is stored in the memory component and indicates the corresponding relationship between the control codes and the number keys when the control component receives an operation signal indicating that the function switching key of the remote control is operated.

6. The electronic device according to claim 1, wherein the control component is further configured to control the external electronic device by transmitting the control codes to the external electronic device based on HDMI (High Definition Multimedia Interface) standards.

7. The electronic device according to claim 6, wherein the transmission component includes an HDMI terminal electrically connected to an HDMI terminal of the external electronic device, and configured to transmit the control codes to the external electronic device.

8. The electronic device according to claim 6, wherein the control component is further configured to transmit the control codes including a CEC (Consumer Electronics Control) message defined by the HDMI standards.

9. The electronic device according to claim 1, further comprising a television receiving component configured to be controlled by the remote control to receive television broadcasts.

10. The electronic device according to claim 2, wherein the control component is further configured to control the external electronic device by transmitting the control codes to the external electronic device based on HDMI (High Definition Multimedia Interface) standards.

11. The electronic device according to claim 2, further comprising a television receiving component configured to be controlled by the remote control to receive television broadcasts.

12. The electronic device according to claim 3, wherein the control component is further configured to control the external electronic device by transmitting the control codes to the external electronic device based on HDMI (High Definition Multimedia Interface) standards.

13. The electronic device according to claim 3, further comprising a television receiving component configured to be controlled by the remote control to receive television broadcasts.

14. The electronic device according to claim 4, wherein the control component is further configured to control the external electronic device by transmitting the control codes to the external electronic device based on HDMI (High Definition Multimedia Interface) standards.

15. The electronic device according to claim 4, further comprising a television receiving component configured to be controlled by the remote control to receive television broadcasts.

* * * * *